United States Patent
Chen et al.

(10) Patent No.: US 8,176,328 B2
(45) Date of Patent: May 8, 2012

(54) AUTHENTICATION OF ACCESS POINTS IN WIRELESS LOCAL AREA NETWORKS

(75) Inventors: Shu-Lin Chen, Kanata (CA); Stanley Chow, Ottawa (CA); Christophe Gustave, Ottawa (CA)

(73) Assignee: Alcatel Lucent, Paris (FR)

( * ) Notice: Subject to any disclaimer, the term of this patent is extended or adjusted under 35 U.S.C. 154(b) by 778 days.

(21) Appl. No.: 12/211,980

(22) Filed: Sep. 17, 2008

(65) Prior Publication Data

US 2010/0070771 A1    Mar. 18, 2010

(51) Int. Cl.
 *H04L 29/06* (2006.01)
 *H04L 9/32* (2006.01)
 *G06F 7/04* (2006.01)

(52) U.S. Cl. ........ 713/176; 713/155; 713/156; 713/161; 713/169; 713/170; 713/171; 713/173; 713/175; 713/180; 713/182; 726/1; 726/2; 726/3; 726/5; 726/10; 726/26; 726/29; 726/30; 380/277; 380/278; 380/279; 380/282; 380/30

(58) Field of Classification Search .................. 713/173, 713/176, 155–156; 726/18–19, 10
See application file for complete search history.

(56) References Cited

U.S. PATENT DOCUMENTS

| | | | |
|---|---|---|---|
| 7,174,456 B1 * | 2/2007 | Henry et al. .................. 713/158 |
| 7,430,606 B1 * | 9/2008 | Meandzija et al. ............ 709/229 |
| 7,542,572 B2 * | 6/2009 | Meier et al. .................... 380/277 |
| 7,808,958 B1 * | 10/2010 | Hernacki et al. .............. 370/338 |
| 7,885,639 B1 * | 2/2011 | Satish et al. ................... 455/410 |
| 8,001,381 B2 * | 8/2011 | Metke et al. ................... 713/169 |
| 2004/0049699 A1 * | 3/2004 | Griffith et al. ................. 713/201 |
| 2004/0243804 A1 * | 12/2004 | Tajima ........................... 713/175 |
| 2005/0147073 A1 * | 7/2005 | Hietalahti et al. ............. 370/338 |
| 2006/0075075 A1 * | 4/2006 | Malinen et al. ................ 709/220 |
| 2006/0128415 A1 * | 6/2006 | Horikoshi et al. ............. 455/522 |
| 2006/0135068 A1 * | 6/2006 | Jaakkola et al. .............. 455/41.2 |
| 2006/0174106 A1 * | 8/2006 | Bell et al. ....................... 713/156 |
| 2007/0178841 A1 * | 8/2007 | Oliynyk et al. ............. 455/67.11 |
| 2008/0002651 A1 * | 1/2008 | Nakano .......................... 370/338 |
| 2008/0060066 A1 * | 3/2008 | Wynn et al. ....................... 726/6 |
| 2008/0186932 A1 * | 8/2008 | Do et al. ........................ 370/338 |
| 2008/0199013 A1 * | 8/2008 | Macaulay ...................... 380/283 |
| 2009/0217043 A1 * | 8/2009 | Metke et al. ................... 713/171 |
| 2009/0232311 A1 * | 9/2009 | Meier et al. .................... 380/277 |
| 2009/0327812 A1 * | 12/2009 | Zhang et al. ..................... 714/32 |
| 2010/0005290 A1 * | 1/2010 | Urien et al. .................... 713/155 |
| 2010/0031029 A1 * | 2/2010 | Ilyadis ........................... 713/156 |
| 2010/0031031 A1 * | 2/2010 | Tian et al. ...................... 713/156 |
| 2010/0106966 A1 * | 4/2010 | Santos et al. .................. 713/156 |
| 2011/0264915 A1 * | 10/2011 | Cam-Winget et al. ........ 713/171 |

\* cited by examiner

*Primary Examiner* — Edan Orgad
*Assistant Examiner* — Jenise Jackson
(74) *Attorney, Agent, or Firm* — Fay Sharpe LLP

(57) ABSTRACT

A method for authenticating an operator of an AP includes: registering the operator's identity with a CA, by providing the operator's identification information and public key; creating a certificate including the foregoing; signing the certificate with the CA's private key; provisioning the AP with the signed certificate; provisioning a client with the CA's public key; sending a request from the client to the AP; generating a signature with the operator's private key; returning a reply to the client, including the AP provisioned certificate signed with the generated signature; using the client provisioned CA's public key to obtain the operator's public key from the certificate received in the reply; and, using the operator's public key obtained from the certificate received in the reply to verify the signature generated with the operator's private key and used by the AP to sign the certificate received in the reply.

18 Claims, 4 Drawing Sheets

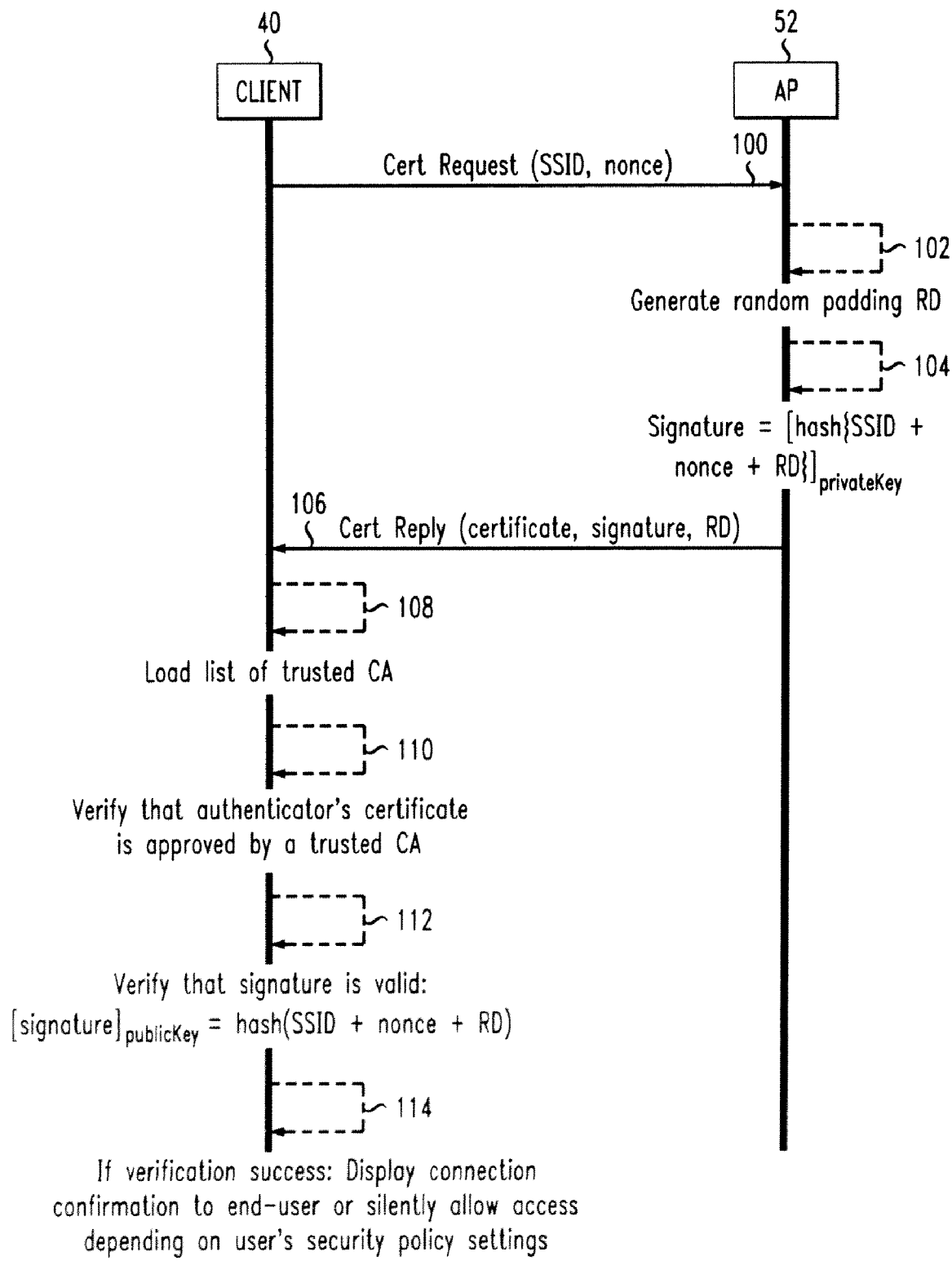

AUTHENTICATION OF ACCESS POINTS IN WIRELESS LOCAL AREA NETWORKS

FIELD

The present inventive subject matter relates generally to the art of wireless local area networks. Particular application is found in conjunction with a wireless local area network (WLAN), e.g., such as an 802.11 network defined by the IEEE (Institute of Electrical and Electronics Engineers) Standards Association or a Wi-Fi network defined by the Wi-Fi Alliance, and the specification makes particular reference thereto. However, it is to be appreciated that aspects of the present inventive subject matter are also amenable to other like networks and/or applications.

BACKGROUND

A rogue access point (AP) (e.g., such as the commonly known "evil twin") can be a significant security threat for 802.11 networks and/or other like WLANs. The term evil twin generally refers to a rogue AP that appears to be a legitimate one offered on a given premises, but actually has been setup by a hacker or other unauthorized entity to intercept and/or eavesdrop on the wireless communications of clients and/or users connecting to and/or employing the AP, e.g., to surf or otherwise access the Internet.

For example, such evil twins are commonly employed in or near locations or venues that provide the general public access their WLAN, i.e., public hotspots. Generally, the public uses a laptop or other suitable portable device or client (e.g., that is Wi-Fi enabled) to access the wireless connection provided by the legitimate AP, e.g., which may be owned and/or operated by the particular location or venue. For example, hotspots are often found at restaurants, train stations, airports, libraries, hotels, hospitals, coffee shops, bookstores, fuel stations, department stores, supermarkets, schools and other public places. However, an evil twin setup in such a location seeks to trick or otherwise deceive users into connecting to the rogue AP as opposed to the legitimate AP, i.e., the AP to which the user may really desire a connection and/or the AP to which the user thinks they are really connecting. Often, the deception is perpetrated by making the otherwise rogue wireless network appear to be legitimate to the unwitting user by simply giving the rogue AP a similar name to the legitimate WLAN and/or AP being offered and/or operated on the premises. In this regard, it remains important, especially in the case of public APs, for end users to positively known the AP to which they are connecting.

As is known in the art, 802.1x (an IEEE standard for port-based network access control) combined with EAP (Extensible Authentication Protocol) provides a framework to authenticate and control traffic to a protected network. By applying different authentication protocols such as EAP-TLS (EAP-Transport Layer Security) and/or EAP-TTLS (EAP-Tunneled Transport Layer Security), clients (also known as supplicants in 802.1x parlance) and APs are able to achieve mutual authentication. In a typical deployment, an authentication server (e.g., such as a RADIUS (Remote Authentication Dial In User Service) server) is used as part of the framework.

While the foregoing approach is largely acceptable for regulating the access of WLAN clients to network resources, it generally falls short at protecting miscellaneous clients from potentially harmful wireless networks. That is to say, existing solutions are for the most part targeted to closed network environments, i.e., where both the WLAN clients and APs are managed and/or controlled by the same entity (i.e., a company or other enterprise) to provide mutual authentication. Thus, in the case of EAP-TLS for example, a public key of an AP has to be provisioned on every client machine in order for that client machine to be able to connect to the AP. Accordingly, while this can usually be done rather efficiently for each user or client machine of a given company or enterprise (i.e., seeing as the enterprise will generally have access to and/or control over the client machines), it is largely impractical for public users or visitors (i.e., where the enterprise or AP owner/operator will generally not have access to and/or control over the respective client machines of public users or visitors). Moreover, the forgoing approach still may not satisfactorily answer the question of AP ownership. For example, a visitor or other user in a particular venue may only want to connect to APs owned and/or operated by that particular venue. 802.1x does not generally provide a positive identification of the entity that owns/operates a particular AP.

Accordingly, a new and improved system and/or method is disclosed that addresses the above-referenced problems and others.

SUMMARY

In accordance with one embodiment, a method is provided for authenticating an identity of an operator of an access point (AP) of a wireless local area network (WLAN) to a client seeking a connection with the AP. The method includes: registering the identity of the operator of the AP with a trusted certificate authority (CA), the registering including providing the CA with (i) identification information identifying the operator and (ii) a public key of the operator; creating an authentication certificate including the operator's identification information and the operator's public key; signing the certificate with a private key of the CA; provisioning the AP with the certificate that was signed with the private key of the CA; provisioning the client with a public key of the CA, the CA's public key being a corresponding counterpart to the CA's private key; sending a certificate request from the client to the AP; generating a signature with a private key of the operator, the operator's private key being a corresponding counterpart for the operator's public key; returning a certificate reply from the AP to the client in response to the request, the reply including the certificate with which the AP was provisioned signed by the AP with the generated signature; using the CA's public key with which the client was provisioned to obtain the operator's public key from the certificate received in the reply; and, using the operator's public key obtained from the certificate received in the reply to verify the signature generated with the operator's private key and used by the AP to sign the certificate received in the reply.

In accordance with another embodiment, a system is provided for authenticating an identity of an operator of an access point (AP) of a wireless local area network (WLAN) to a client seeking a connection with the AP. The system includes: registry means for registering the identity of the operator of the AP with a trusted certificate authority (CA), the registering including providing the CA with (i) identification information identifying the operator and (ii) a public key of the operator; certificate creation means for creating an authentication certificate including the operator's identification information and the operator's public key, the certificate being signed with a private key of the CA; AP provisioning means for provisioning the AP with the certificate created by the certificate creation means; client provisioning means for provisioning the client with a public key of the CA, the CA's public key being a corresponding counterpart to the CA's private key; certificate requesting means for sending a certificate request from the client to the AP; signature generating means for generating a signature with a private key of the operator, the operator's private key being a corresponding counterpart for the operator's public key; reply means for returning a certificate reply from the AP to the client in response to the request sent by the certificate requesting means, the reply including the certificate with which the AP was provisioned signed by the AP with the signature from the signature generating means; certificate verification means that uses the CA's public key with which the client was provisioned to obtain the operator's public key from the certificate received in the reply; and, signature verification means that uses the operator's public key obtained from the certificate received in the reply to verify the signature generated with the operator's private key and used by the AP to sign the certificate received in the reply.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter disclosed herein may take form in various components and arrangements of components, and in various steps and arrangements of steps. The drawings are only for purposes of illustrating preferred embodiments and are not to be construed as limiting. Further, it is to be appreciated that the drawings are not to scale.

FIG. 4 is a post and rail diagram showing an exemplary message exchange and/or process for authenticating an AP to a WLAN client in accordance with aspects of the present inventive subject matter.

DETAILED DESCRIPTION OF PREFERRED EMBODIMENTS

For clarity and simplicity, the present specification shall refer to structural and/or functional elements, entities and/or facilities, relevant standards, protocols and/or services, and other components that are commonly known in the art without further detailed explanation as to their configuration or operation except to the extent they have been modified or altered in accordance with and/or to accommodate the preferred embodiment(s) presented herein.

In general, the present specification is directed to a WLAN authentication solution which is an extension and/or alternate application of the authentication framework disclosed in U.S. Patent Application Publication No. 2008/0181379, incorporated by reference herein in its entirety. More specifically, the present specification describes a method and/or system that uses public key cryptography techniques and a set of certificate registries to achieve strong AP to client authentication which positively identifies the owner and/or operator of a particular AP for WLAN clients wishing to connect therewith. One advantage of the described approach is that for identification purposes, clients do not have to know any technical details about the AP (e.g., the MAC (Media Access Control) address, SSID (Service Set Identifier), etc.). Rather, the identity of the owner/operator of the AP in question is positively confirmed with the aid of pre-deployed registries of certified APs. Therefore, even if there is a change in the way a particular AP is configured, it can still be trusted as long as it can be proven that the AP is still owned/operated by a trusted entity. Moreover, as an additional benefit, WLAN clients do not have to be provisioned with an array of different public key information for a plurality of different APs, so long as the APs are certified by the same registry.

Figure 1:
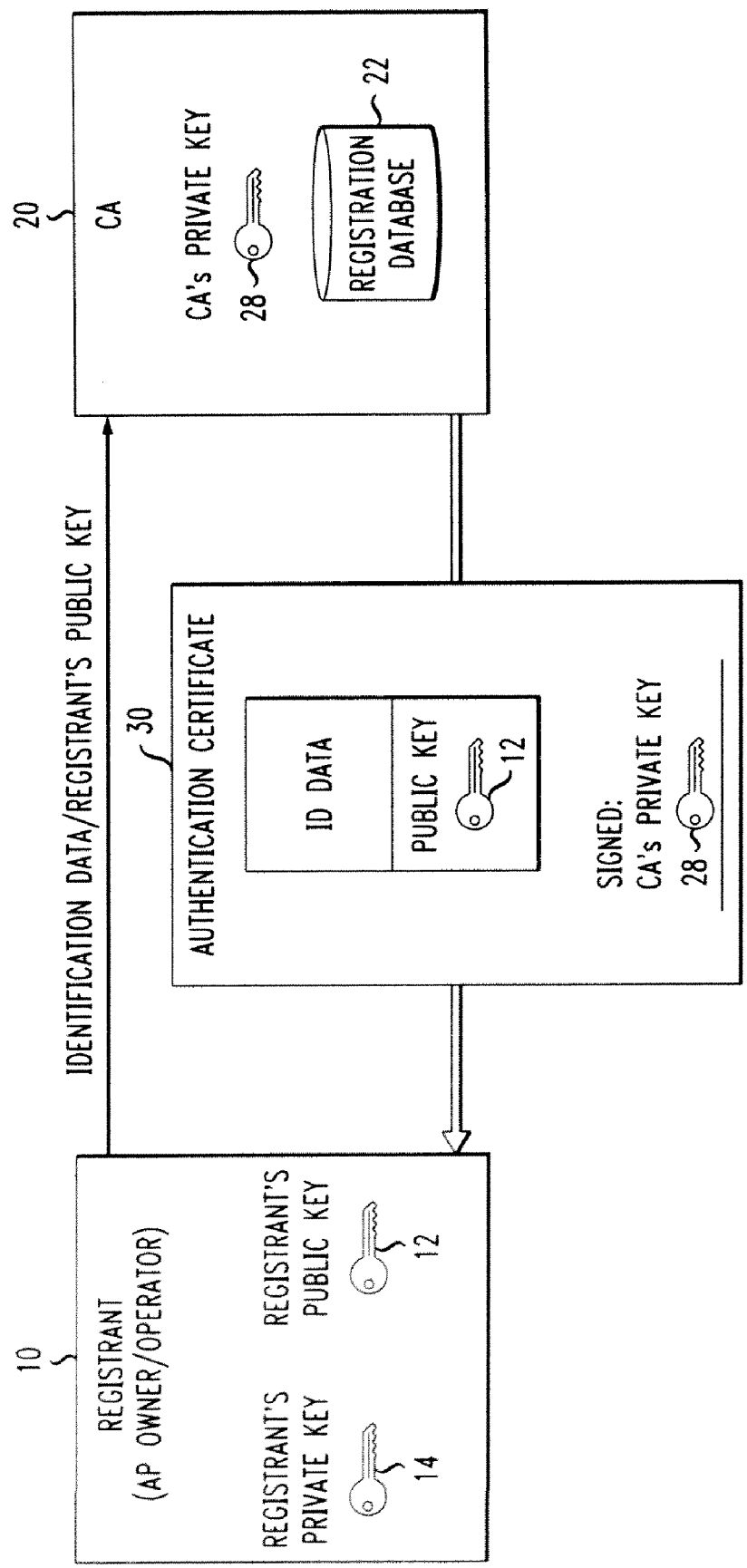
FIG. 1 is diagrammatic illustration showing an exemplary infrastructure and/or process for the registration of names, identification information and/or other like IDs of AP owners and/or operators in accordance with aspects of the present inventive subject matter.

FIG. 1 is a schematic diagram of an exemplary registration infrastructure and/or process for the registration of names and/or other like identification information or IDs of AP owners and/or operators in accordance with aspects of the present inventive subject matter. In the illustrated example, there is shown a single registrant 10 (i.e., an AP owner/operator) registering with a single registry and/or certificate authority (CA) 20. In practice, however, a given registrant may selectively register with any number (i.e., one or more) of separately deployed and/or otherwise established registries or CAs (e.g., arranged and/or provisioned similarly to the CA 20), and each such registry and/or CA may register any number (i.e., one or more) of applying registrants (e.g., arranged and/or provisioned similarly to the registrant 10). For example, in practice a plurality of different registries and/or CAs may optionally be deployed or otherwise established to serve different groups and/or types of registrants and/or end-users. That is to say, a first registry and/or CA may be aimed, e.g., at serving an indiscriminate group of registrants and/or end-users, while a second registry and/or CA may be aimed, e.g., at serving some particular group or type of registrants and/or end-users (such as enterprises or end-users associated with a particular industry or trade or other special interest), and yet a third registry and/or CA may be aimed, e.g., at serving yet another particular group or type of registrants and/or end-users (such as those in a particular geographical or geo-political region). Nevertheless, while each registry and/or CA suitably serves a predetermined subscriber group, region and/or a predefined interest group, it is to be appreciated that a region or group served by one registry and/or CA may overlap a region or group served by another, and two or more registries and/or CAs may serve the same region or group.

As a further example, one registry and/or CA may be operationally operated by a service provider that wishes to provide an authenticated AP service to any company, public or government organization, or other registrant 10 who wishes to provide authenticated AP identification to WLAN clients wanting to employ the AP. Yet another registry and/or CA may be optionally operated by an interest group, such as the Canadian Bankers Association®, which maintains the registry and/or CA to provide authenticated AP registration services to its bank members. As yet a further example, another registry and/or CA is optionally associated with a geographical or political region, such as New York State; the Province of Ontario; the City or Toronto; the greater Chicago area; etc. and is operated by a corresponding government agency or other official entity.

In any event, suitably, the AP owner/operator or registrant 10 registers their name, identification information and/or other like ID with the selected CA 20 so as to be able to authenticate their ownership and/or operation of one or more APs (e.g., by providing their authenticated name, identification information and/or other like ID) to WLAN clients that subscribe to the particular registry or CA 20 or that are otherwise provisioned with the public key of the corresponding CA 20. Accordingly, as illustrated, the CA 20 suitably maintains a database 22 of names, identification information and/or other like IDs for registered AP owners/operators, such as the registrant 10.

Suitably, the CA 20 may be any public or private organization interested in providing an authenticated registry. Optionally, a higher-level authority does not have to sanction the CA 20. Rather, end-users can determine if the given registry and/or CA 20 is trustworthy, and subscribe only if it is determined to be trustworthy. In one embodiment of the invention, the only responsibility borne by the CA 20 is to ensure proof of identity of any registrant, and ensure that it does not register any duplicate name, identification information or other ID for different registrants. In this embodiment, the registry (which consists of the database (DB) 22 and the CA 20) can be freely inspected by the public and it is the responsibility of registrants and/or other interested parties to police the registries in order to ensure that a confusingly similar or misleading identity is not registered by another registrant.

In any event, when the registrant 10 is registered, the CA 20 issues an authentication certificate 30. The certificate 30 certifies that the registered AP owner/operator's identity is bound to the registrant's public key 12 (which is in turn implicitly paired with the registrant's private key 14). Suitably, the authentication certificate 30 provided to the registrant 10 by the registry or CA 20 can optionally conform to any known authentication system, and each registry or CA 20 can use a different authentication system without departing from the scope of the present inventive subject matter. When the registrant's name, identification information or other like ID is recorded in a registry and/or DB 22, the corresponding authentication certificate 30 is provided to the registrant 10 to permit AP authentication to be performed. Optionally, the certificate 30 can be based on any public key infrastructure scheme, e.g., like X.509 defined by the ITU-T (i.e., the International Telecommunication Union—Telecommunication Standardization Sector). If an X.509 certificate is used for the authentication certificate 30 provided to the registrant 10, in one embodiment the initial steps of AP owner/operator registration and/or client provisioning may optionally be carried out as described below.

Figure 2:
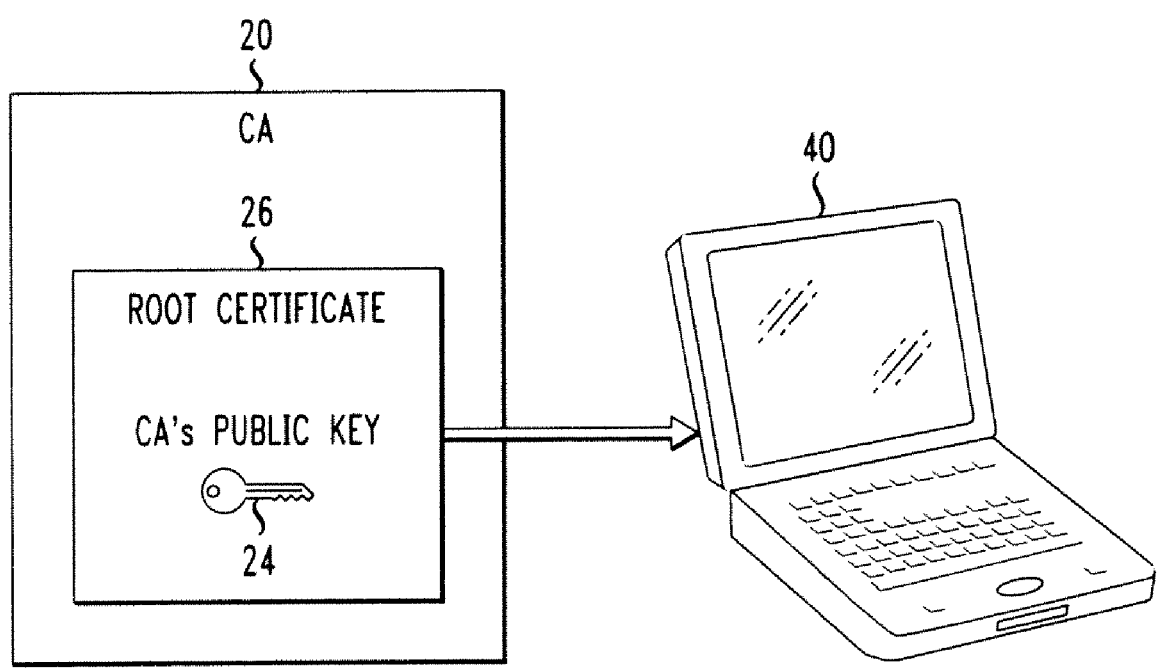
FIG. 2 is diagrammatic illustration showing an exemplary infrastructure and/or process for provisioning WLAN clients with the root certificates and/or public keys of certificate authorities in accordance with aspects of the present inventive subject matter.

With reference now additionally to FIG. 2, suitably, each CA 20 publishes its public key 24 in its root certificate 26. As will be described later herein, the CA's public key 24 is used to verify the authentication certificates 30 issued by the CA 20, accordingly the root certificate 26 and/or the CA's public key 24 is imported into or otherwise provisioned on each WLAN client 40 that will perform the AP authentication using authentication certificates 30 issued by the CA 20 in question. While for simplicity and clarity only one WLAN client 40 is illustrated and/or discussed in the examples and/or embodiments presented herein, it is to be appreciated that in practice generally any number (i.e., one or more) of WLAN clients may be similarly situated and/or equipped.

Suitably, vendors of WLAN clients may optionally preload the root certificates and/or CA public keys of interest (e.g., including those of any local regional registries, popular trade and professional registries, etc.) in much the same way that web browsers are pre-loaded with PKI (Public Key Infrastructure) certificates. Alternately or in addition, as show in FIG. 2, an end-user may also import or otherwise load one or more root certificates and/or CA public keys (e.g., such as the root certificate 26 and/or public key 24 of the CA 20) onto their WLAN client 40 as desired, e.g., in the cases where the end-user does business in multiple regions or is interested in one or more specialized registry. As understood by those skilled in the art, there is generally no limit to how many root certificates and/or public keys can be imported or provisioned on the WLAN client 40 of an end-user.

Suitably, as shown, the WLAN client 40 is implemented as a laptop computer or other like portable device equipped with a wireless network adapter and/or card or a wireless network interface controller (WNIC) or the like. Alternately, the client 40 may be any other Wi-Fi or 802.11 network enabled device.

Returning attention now to FIG. 1, in accordance with one exemplary embodiment, each applicant (i.e., AP owner/operator) wishing to become a registrant 10, generates its own public/private key pair (i.e., 12 and 14 respectively), and submits their public key 12 to the respective CA 20 along with their name, identification information and/or other like ID, and any other appropriate registration information and/or documentation. Thereafter, if the respective CA 20 determines that the applicant in fact owns or is otherwise entitled to register the supplied name, identification information and/or other like ID, then the CA 20 enters the foregoing identification data into its database 22 and uses its private key (i.e., the CA's private key 28) to sign an authentication certificate 30 that includes the registrant's identification data and the registrant's public key 12. In this manner, the respective CA 20 "vouches" that the registrant's public key 12 (i.e., contained in the certificate 30) is in fact the public key 12 that is bound to the registrant's name, identification information and/or other like ID (which is also contained in the certificate 30), and that the registrant 10 is entitled to use this identification data. In turn, the authentication certificate 30 which is signed with the respective CA's private key 28 and which includes the registrant's identification data and the registrant's public key 12 is returned or otherwise provided to registrant 10 (i.e., the owner/operator of the AP which will then employ the received authentication certificate 30 for authentication proposes).

As can be appreciated, the registrant 10 now has an authentication certificate 30 (signed and issued by the respective CA 20) that attests to its identification data, and the registrant 10 also has its own private key 14 that permits the registrant 10 to validate that authentication certificate 30.

Figure 3:
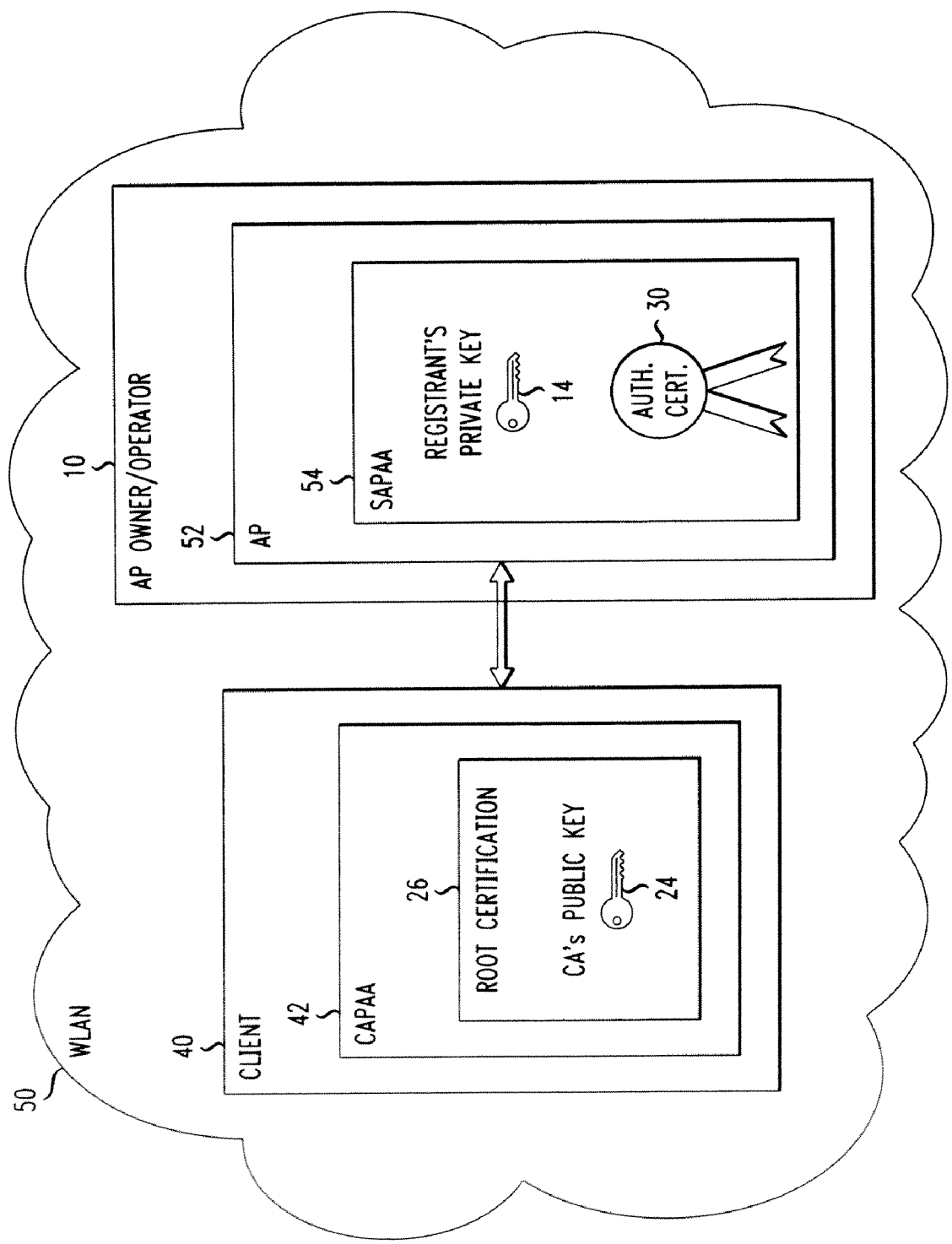
FIG. 3 is diagrammatic illustration showing an exemplary infrastructure and/or process for executing AP authentication in accordance with aspects of the present inventive subject matter.

With attention now to FIG. 3, there is shown an embodiment of an AP authentication arrangement in accordance with aspects of the present inventive subject matter. In the illustrated example, the client 40 (which has, e.g., as described above, been previously provisioned with the root certificate 26 and/or public key 24 of the CA 20) is shown attempting to connect to a WLAN 50 via an AP 52 which is owned and/or operated, e.g., by an entity (such as the registrant 10) that has previously registered with the CA 20 (e.g., in the manner described above). As shown, the AP 52 is optionally provisioned with a server AP authentication application (SAPAA) 54 which provides or otherwise supports AP authentication functionality from the AP side. Suitably, the SAPAA 54 is provisioned with the registrant's authentication certificate 30 that was received from the CA 20 and with the registrant's private key 14.

Optionally, the WLAN client 40 suitably performs or otherwise controls the authentication of the AP 52. To this end, the client 40 is equipped and/or otherwise provisioned with a client AP authentication application (CAPAA) 42, which provides for a very secure form of AP authentication in accordance with aspect of the present inventive subject matter. As can be appreciated, this security stems from the client 40 having direct control and/or oversight of the CAPA 42, meaning that the end-user of the client 40 has only to trust their own device. Of course, however, in other alternate embodiments, it is possible to have a trusted proxy perform the authentication. But, such an arrangement may open up avenues of attack and/or make AP authentication more difficult to make secure.

With reference now to FIG. 4, there is shown an exemplary AP authentication process in accordance with aspect of the present inventive subject matter. At step 100, upon detecting the presence of the WLAN 50 (e.g., by receiving a broadcast message from the AP 52 including the SSID of the WLAN 50), the client 40 generates and/or forwards a certificate request message to the AP 52. Suitably, the certificate request message includes the SSID of the detected WLAN 50 (e.g., obtained from the aforementioned broadcast message) along with a generated or otherwise determined secret code, e.g., such as a nonce (number user once).

At step 102, upon receiving the certificate request message from the client 40, the AP 52 generates a random padding number or value (RD).

At step 104, the AP 52 generates a digital signature and digitally signs the authentication certificate 30 with which it was provisioned. As shown, the signature is a hash of the SSID, the nonce (or other secret code) receiving in the certificate request message, and the generated random padding number or value RD, encrypted with the private key 14 of the registrant 10 (i.e., the owner/operator of the AP 52).

At step 106, in response to the received certificate request message, the AP 52 returns a certificate reply massage to the client 40. As shown, the certificate reply message includes the AP's authentication certificate 30, the signature from step 104, and the RD from step 102.

At step 108, upon receiving the certificate reply message, the client 40 loads a list of trusted CAs. Suitably, in this example, the list may include the CA 20. By loading the list, the client 40 now has access to the public keys of each CA in the loaded list. Accordingly, if the client 40 has previously been provisioned with the public key 24 of the CA 20, then that public key 24 is now made available for decryption and/or authentication purposes.

At step 110, the client 40 verifies that the certificate 30 received in the certificate reply message is in fact approved by a trusted CA or otherwise authentic. In particular, using the public key 24 of the CA 20 (e.g., with which the client 40 was previously provisioned), the certificate 30 included in the certificate reply message (e.g., which was previously encrypted with the CA's private key 28 when the certificate 30 was issued) is now able to be decrypted to reveal the identification data contained in the certificate 30 and the public key 12 of the registrant 10 which is bound to the identification data in the certificate 30. In this way, the client 40 obtains the identification data contained in the received certificate 30 and the registrant's public key 12 which is also contained in the received certificate 30. Moreover, insomuch as the CA's public key 24 works to unlock or decrypt the certificate 30, the client is assured that the certificate 30 was in fact encrypted with the CA's private key 28 when the certificate 30 was issued, and accordingly, the identification data and registrant's public key 12 contained therein are therefore authentic.

At step 112, the client 40 then verifies the signature received in the certificate reply message. Suitably, this is accomplished using the public key 12 recovered in step 110 from the certificate 30 included in the certificate reply message. In particular, the public key 12 recovered from the certificate 30 is used to decrypt the signature received in the certificate reply message, i.e., thereby revealing the hash of the SSID, nonce and RD. In this manner, insomuch as the public key 12 recovered from the received certificate 30 works to unlock or decrypt the received signature to reveal the same hash as was generated in step 104, the client 40 is assured that the signature was encrypted with the registrant's corresponding private key 14, and accordingly, the signature is authentic.

At step 114, depending on security policy settings, if the foregoing verifications from steps 110 and 112 are successful, then the client 40 may automatically complete the connection to the AP 52 or prompt the end-user to confirm a connection to the AP 52, e.g., which has been positively identified as being owned and/or operated by the registrant 10. In particular, in the latter case, the client 40 optionally displays or otherwise provides the end-user with the authenticated name, identification information or other ID recovered from the certificate 30 received in the certificate reply message.

Of course, as can be appreciate, the foregoing approach provides a convenient and/or suitable solution which allows WLAN clients and/or their end-users to positively identify via trusted CAs who the owner and/or operator of an AP is prior to completing a connection therewith. Significantly, by implementing the foregoing solution, connections to rogue APs or evil twins (i.e., APs without proper or authentic credentials) can be avoided. That is to say, e.g., if a certificate received in a certificate reply message cannot be accurately decrypted with the public key of a trusted CA, then it is known that the certificate was not issued by a trusted CA, and accordingly, the AP returning the certificate reply message should not be trusted. Or, if the public key recovered from a certificate received in a certificate reply message does not accurately decrypt the signature provided by the AP along with the certificate, then the AP should again not be trusted. Accordingly, WLAN clients provisioned with the present solution an pervasively navigate different networks bound to different APs and still have the assurance that they are connected to an entry point they trust.

In conclusion, it is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for authenticating an identity of an operator of an access point (AP) of a wireless local area network (WLAN) to a client seeking a connection with said AP, said method comprising:
   (a) registering the identity of the operator of the AP with a trusted certificate authority (CA), said registering including providing the CA with (i) identification information identifying the operator and (ii) a public key of the operator;
   (b) creating an authentication certificate including the operator's identification information and the operator's public key;
   (c) signing the certificate with a private key of the CA;
   (d) provisioning the AP with the certificate that was signed with the private key of the CA;
   (e) provisioning the client with a public key of the CA, said CA's public key being a corresponding counterpart to the CA's private key;
   (f) sending a certificate request from the client to the AP;
   (g) generating a signature with a private key of the operator, said operator's private key being a corresponding counterpart for the operator's public key;
   (h) returning a certificate reply from the AP to the client in response to the request, said reply including the certificate with which the AP was provisioned signed by the AP with the generated signature;
   (i) using the CA's public key with which the client was provisioned to obtain the operator's public key from the certificate received in the reply; and,
   (j) using the operator's public key obtained from the certificate received in the reply to verify the signature generated with the operator's private key and used by the AP to sign the certificate received in the reply.

2. The method of claim 1, wherein sending the request in step (f) is prompted by the client detecting the WLAN, said detecting including receiving a broadcast from the AP that includes an identifier of the WLAN.

3. The method of claim 2, wherein the identifier of the WLAN is a Service Set Identifier (SSID).

4. The method of claim 3, wherein the request includes the SSID obtained by the client from the broadcast of the AP.

5. The method of claim 4, wherein the request further includes a secret code.

6. The method of claim 5, wherein the secret code is a nonce.

7. The method of claim 6, said method further comprising: generating a random padding value.

8. The method of claim 7, wherein the generated signature is a hash of the SSID, the nonce and the random padding value encrypted by the operator's private key.

9. The method of claim 8, wherein the client is provisioned with a plurality of public keys from a plurality of trusted CA's, and prior to step (i) a list of trusted CAs are loaded in the client, and the client uses the corresponding public keys of the respective CAs to verify that the certificate received in the reply is approved by at least one trusted CA in the loaded list.

10. A system for authenticating an identity of an operator of an access point (AP) of a wireless local area network (WLAN) to a client seeking a connection with said AP, said system comprising:
   registry means for registering the identity of the operator of the AP with a trusted certificate authority (CA), said registering including providing the CA with (i) identification information identifying the operator and (ii) a public key of the operator;
   certificate creation means for creating an authentication certificate including the operator's identification information and the operator's public key, said certificate being signed with a private key of the CA;
   AP provisioning means for provisioning the AP with the certificate created by the certificate creation means;
   client provisioning means for provisioning the client with a public key of the CA, said CA's public key being a corresponding counterpart to the CA's private key;
   certificate requesting means for sending a certificate request from the client to the AP;
   signature generating means for generating a signature with a private key of the operator, said operator's private key being a corresponding counterpart for the operator's public key;
   reply means for returning a certificate reply from the AP to the client in response to the request sent by the certificate requesting means, said reply including the certificate with which the AP was provisioned signed by the AP with the signature from the signature generating means;
   certificate verification means that uses the CA's public key with which the client was provisioned to obtain the operator's public key from the certificate received in the reply; and,
   signature verification means that uses the operator's public key obtained from the certificate received in the reply to verify the signature generated with the operator's private key and used by the AP to sign the certificate received in the reply.

11. The system of claim 10, wherein certificate requesting means is prompted by the client detecting the WLAN, said detecting including receiving a broadcast from the AP that includes an identifier of the WLAN.

12. The system of claim 11, wherein the identifier of the WLAN is a Service Set Identifier (SSID).

13. The system of claim 12, wherein the request includes the SSID obtained by the client from the broadcast of the AP.

14. The system of claim 13, wherein the request further includes a secret code.

15. The system of claim 14, wherein the secret code is a nonce.

16. The system of claim 15, said system further comprising:
   random pad generating means for generating a random padding value.

17. The system of claim 16, wherein the signature generated by the signature generating means is a hash of the SSID, the nonce and the random padding value encrypted by the operator's private key.

18. The system of claim 17, wherein the client is provisioned with a plurality of public keys from a plurality of trusted CA's, and prior to operation of the certificate verification means a list of trusted CAs are loaded in the client, and the client uses the corresponding public keys of the respective CAs to verify that the certificate received in the reply is approved by at least one trusted CA in the loaded list.

* * * * *